US008602861B2

(12) United States Patent
Schugar

(10) Patent No.: US 8,602,861 B2
(45) Date of Patent: Dec. 10, 2013

(54) METHOD AND APPARATUS FOR A WAGERING GAME INCLUDING AN OPTION TO QUICKLY PROGRESS A MULTI-STATE GAME TO COMPLETION

(76) Inventor: David Schugar, Hernando, MS (US)

( * ) Notice: Subject to any disclaimer, the term of this patent is extended or adjusted under 35 U.S.C. 154(b) by 0 days.

(21) Appl. No.: 13/351,175

(22) Filed: Jan. 16, 2012

(65) Prior Publication Data

US 2012/0208620 A1 Aug. 16, 2012

Related U.S. Application Data

(60) Division of application No. 10/754,587, filed on Jan. 12, 2004, now Pat. No. 8,096,865, which is a continuation-in-part of application No. 10/410,448, filed on Apr. 10, 2003, now Pat. No. 7,294,054.

(51) Int. Cl.
*A63F 9/24* (2006.01)
*A63F 13/00* (2006.01)

(52) U.S. Cl.
USPC .................................. 463/16; 463/20; 463/25

(58) Field of Classification Search
USPC .......................................... 463/16–20, 25, 29
See application file for complete search history.

(56) References Cited

U.S. PATENT DOCUMENTS

| | | | | |
|---|---|---|---|---|
| 6,238,288 | B1 * | 5/2001 | Walker et al. | 463/26 |
| 7,163,458 | B2 * | 1/2007 | Schugar | 463/16 |
| 7,806,763 | B2 * | 10/2010 | Walker et al. | 463/20 |
| 8,096,865 | B2 * | 1/2012 | Schugar | 463/16 |
| 2003/0114217 | A1 * | 6/2003 | Walker et al. | 463/20 |

* cited by examiner

*Primary Examiner* — Milap Shah
(74) *Attorney, Agent, or Firm* — Muskin & Farmer LLC

(57) ABSTRACT

A method, apparatus, and computer readable storage to implement a progression type game, such as a simulated sport or other game. The game has multiple intermediate game states. The player has the option to bet during the intermediate parts of the game, or accelerate the game to completion. The acceleration option, when exercised, displays the game in a fast version so that the player can quickly see the outcome of the game and receive any earned winnings.

2 Claims, 10 Drawing Sheets

METHOD AND APPARATUS FOR A WAGERING GAME INCLUDING AN OPTION TO QUICKLY PROGRESS A MULTI-STATE GAME TO COMPLETION

CROSS REFERENCE TO RELATED APPLICATIONS

This Application is a Divisional Application of application Ser. No. 10/754,587, filed on Jan. 12, 2004 now U.S. Pat No. 8,096,865, entitled, "Casino Games Directed to Betting on Progressions", which is a Continuation in Part of application Ser. No. 10/410,448, filed on Apr. 10, 2003, now U.S. Pat. No. 7,294,054, both applications of which are incorporated herein by reference in their entireties.

BACKGROUND OF THE INVENTION

1. Field of the Invention

The present invention is directed to a method, apparatus, and computer readable storage medium for casino wagering games. More particularly, the present invention allows players to bet on a variety of progressions.

2. Description of the Related Art

There is a wide variety of casino games currently available. Casino players are always looking for new and exciting ways to place wagers for their own enjoyment. Casino operators are also always looking for new and exciting games to offer their players to improve their casino's profitability.

Current wagering games have many shortcomings. For example, current games are not very scalar as far as the game's design and a manner in which wagers can be placed. Current wagering games such as sports betting also limit the amount of action that can be placed on the game by only allowing wagering before the game has begun. Current wagering games also do not provide the player with opportunities to easily lock in a profit.

Therefore, what is needed is an improved set of games, including an improved paradigm for taking wagers, in which the above shortcomings are overcome.

SUMMARY OF THE INVENTION

It is an aspect of the present invention to provide improvements and innovations in casino games.

The above aspects can be obtained by a system that includes: (a) accepting initial wagers on a game; (b) advancing the game to an advanced situation; (c) accepting further wagers on the game with payouts adjusted according to the advanced situation; and (d) offering an alert to a player if an opportunity arises for the player to make a wager during the game which guarantees the player will profit from the game.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
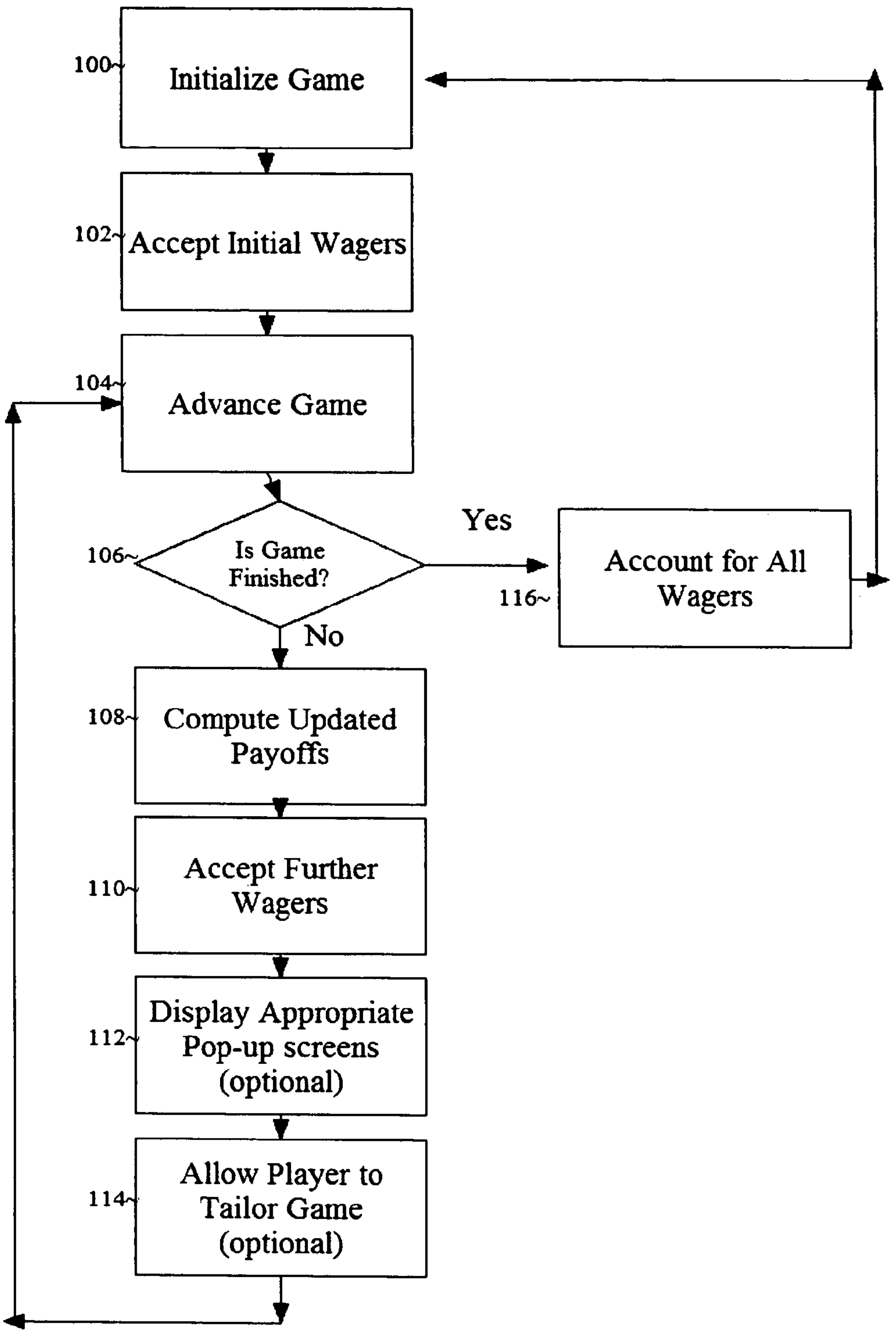
FIG. 1 is a flowchart illustrating a general method of implementing and taking wagers on a progression, according to an embodiment of the present invention.

Reference will now be made in detail to the presently preferred embodiments of the invention, examples of which are illustrated in the accompanying drawings, wherein like reference numerals refer to like elements throughout.

The present invention relates to wagering on casino games and more particular on progression games.

One definition of a progression can be a game where a piece or pieces progress to a final state. Wagers can be made throughout the progression on pieces in the progression and other propositions. For example, a plurality of pieces can progress from a starting point to a finish line, with bets being taken before and during the race. When bets are taken after the race has begun, variable odds are calculated depending on game conditions (such as position of the pieces) and the particular wager (i.e. the piece wagered on). Another definition of a progression is an event whose final outcome can be determined after various stages of random sequences take place and during which the odds change. Wagers can be accepted during the progression allowing the player to change, add to, reverse, or hedge their position. Accepting wagers during a progression at the respective variable odds calculated at that particular moment in the sequence of the game provides unique wagering opportunities to change, add to, reverse, or hedge their position. Odds, payouts, etc, at points during such progression games can be computed as described previously.

FIG. 1 is a flowchart illustrating a general method of implementing and taking wagers on a progression, according to an embodiment of the present invention. This general method can be applied to any of the games described herein, and additional games not described herein as well.

The method starts with operation 100, which initializes the game. Pieces should be moved to initial positions, scores (and other game descriptors) can be reset to 0, etc.

From operation 100, the method then proceeds to operation 102 which accepts initial wagers. Payouts on wagers are computed and displayed according to methods previously described. Payouts can either be reduced to reflect the house edge, or can reflect true odds with a house vigorish (or commission) applied.

From operation 102, the method then proceeds to operation 104 which advances the game.

From operation 104, the method then proceeds to operation 106, which checks to see if the game is finished. If the game is finished, then the method proceeds to operation 116. One method the game can be considered complete is if there are no more live wagers to be determined.

If the check in operation 106 determines that the game is not finished, then the method proceeds to operation 108 which computes updated odds on possible bets. This can be done by using a simulation (such as the simulation described previously), or by using a pure formulaic approach.

From operation 108, the method proceeds to operation 110 which accepts further wagers. These are wagers placed after the game has begun with odds computed to reflect the current situation of the game. The player is not required to make any additional wagers. Payoffs can be offered based on a money line (i.e. +$200, −$250), an even money bet with a point spread, a payoff ratio (i.e. 4:1), or any other acceptable manner. A "fast forward" feature can also be offered here, to be discussed below in more detail.

From operation 110, the method proceeds to operation 112 which displays appropriate pop up screens. This is an optional operation, and even if active there does not have to be a pop up screen displayed each time. These pop up screens were previously described and will also be described below in more detail.

From operation 112, the method proceeds to operation 114 which offers the player an opportunity to "tailor" or adjust the variables to create desired wagering conditions within the game. This is an optional operation will be described below in more detail. From operation 114, the method returns to operation 102 which advances the game.

If the check in operation 106 determines that the game is over, then the method then proceeds to operation 116 which accounts for all wagers. From operation 116, the method can then return to operation 100, which begins a new game.

In another embodiment of the present invention, a game of "musical chairs" can be wagered on. Such a game comprises dynamic and static elements, such as for example dancers (dynamic) and chairs (static). The dynamic elements compete for static elements, of which there are typically less static elements than dynamic elements. Over time, dynamic elements are eliminated until there is one (or more) dynamic elements remaining, upon which the game ends, and the remaining dynamic element(s) can be considered the winner(s).

For example, 5 dancers dance around 4 chairs. Eventually, due to a shortage of one chair, a single dancer is left standing and is thereby eliminated. Thus, there are now 4 dancers and 3 chairs and a new round of wagering begins. The dancers then stand up, and dance around the chairs again. Then another dancer is left standing and another chair is removed, and ultimately another dancer is eliminated, for a total of 3 dancers. This can proceed until there is only one dancer left, who becomes the winner. Of course, the number of dancers and chairs can be tailored to a designers (or player's) preferences. It is also possible to have a shortage of more than one chair per round.

A player can bet simply on which dancer will win the entire game. The player can also bet on which player will be eliminated in a particular round. The player can also make a bet on the order upon which players will be eliminated (or remain). For example, the player can pick two dancers (i.e. A and B) and bet that A will win the entire game and B will be the last dancer to be eliminated. The player can pick a finishing order of 3 (or any number) of dancers as well. Additionally the player may wager upon which chair (or order of chairs) will be eliminated in a separate but inclusive gaming platform.

Table I illustrates some sample bets that can be made and their respective payoffs for a 4 dancer/3 chair embodiment. A "take" bet pays when the event occurs, while the "lay" bet is when the player is betting that event will not occur. For example, if a player lays 1/3, he is betting $100 to win $33.33 on an event with a 3/4 chance of winning.

TABLE I

| 4 dancers & 3 chairs | | |
|---|---|---|
| Bet: Who will be the ultimate remaining player | | |
| True odds: 3:1 against | | |
| Odds | Take | lay |
| payoff | 3 | 1/3 |
| Bet: Who will be eliminated | | |
| True odds: 3:1 against | | |
| Odds | Take | lay |
| payoff | 3 | 1/3 |
| Bet: Specific order of elimination | | |
| True odds: 23:1 against | | |
| Odds | Take | lay |
| payoff | 23 | 1/23 |

Table II illustrates some sample bets that can be made and their respective payoffs for a 4 dancer/3 chair embodiment.

TABLE II

| 3 dancers & 2 chairs | | |
|---|---|---|
| Bet: Who will be the ultimate remaining player | | |
| True odds: 2:1 against | | |
| Odds | Take | lay |
| payoff | 2 | 1/2 |
| Bet: Who will be eliminated | | |
| True odds: 2:1 against | | |
| Odds | Take | lay |
| payoff | 2 | 1/2 |
| Bet: Specific order of elimination | | |
| True odds: 5:1 against | | |
| Odds | Take | lay |
| payoff | 5 | 1/5 |

Table III illustrates some sample bets that can be made and their respective payoffs for a 4 dancer/3 chair embodiment.

TABLE III

| 2 dancers & 1 chair | | |
|---|---|---|
| Bet: Who will be the ultimate remaining player | | |
| True odds: 1:1 against | | |
| Odds | Take | lay |
| payoff | 1 | 1 |
| Bet: Who will be eliminated | | |
| True odds: 1:1 against | | |
| Odds | Take | lay |
| payoff | 1 | 1 |
| Bet: Specific order of elimination | | |
| True odds: 1:1 against | | |
| Odds | Take | lay |
| payoff | 1 | 1 |

Wherever a bet pays true odds, such as in Tables I, II, and III, then a predetermined vigorish can be collected, for example 5%, in order for the house to maintain an advantage.

Figure 2:
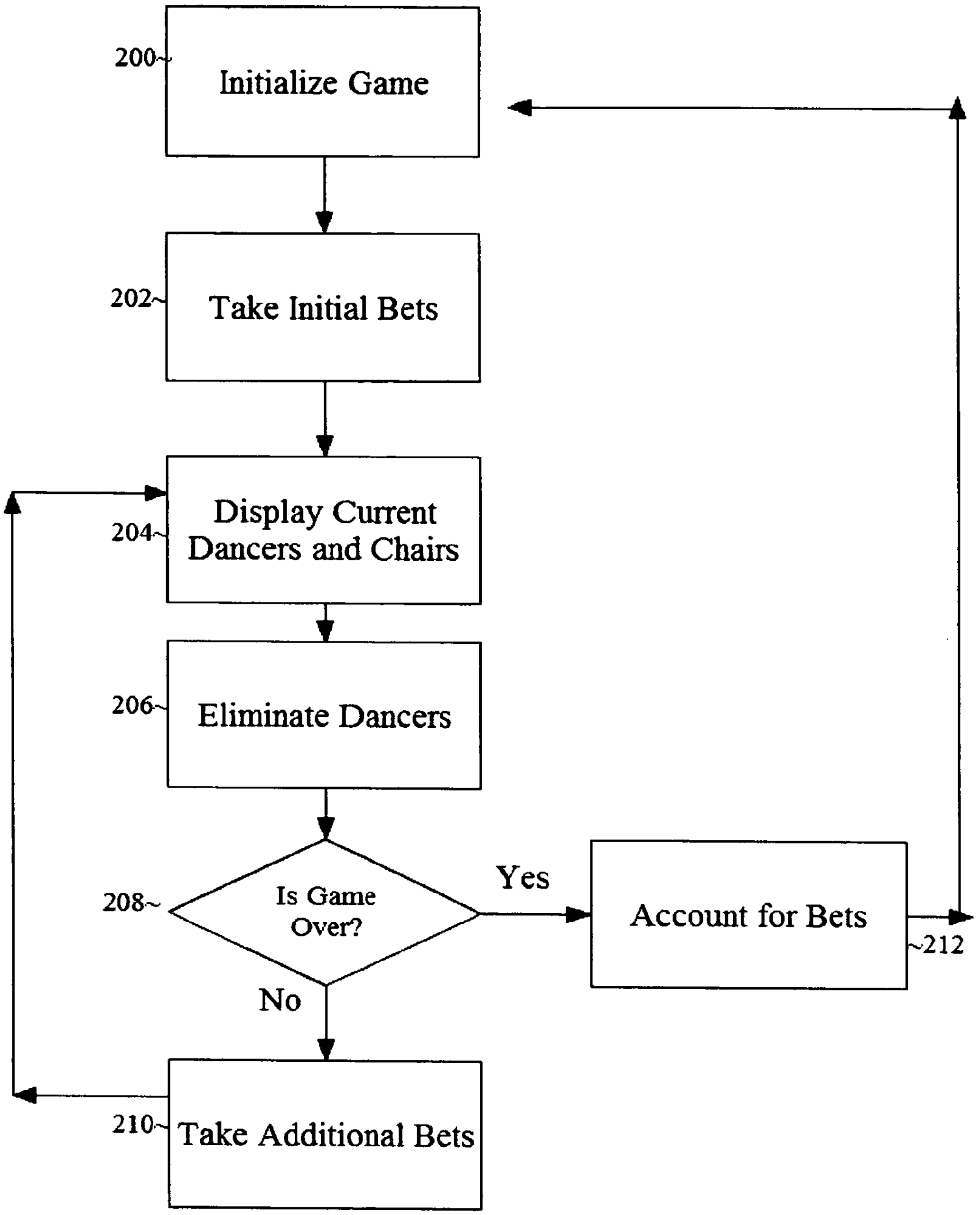
FIG. 2 is a flowchart describing a method of playing musical chairs, according to an embodiment of the present invention.

FIG. 2 illustrates a flowchart describing a method of playing musical chairs, according to an embodiment of the present invention.

The method starts at operation 200, which initializes the game.

From operation 200, the method then proceeds to operation 202, which takes initial bets.

From operation 202, the method then proceeds to operation 204, which displays the current amount of dancers and chairs. If the number of chairs is equal to the number of dancers (or greater than a desired amount), chairs can be eliminated. Preferably, there should be one less chair than dancer.

From operation 204, the method then proceeds to operation 206, which eliminates dancers. A number of dancers equal to the (number of dancers−number of chairs) is eliminated. The elimination can comprise music and animation, such as dancers dancing in tune to music while dancers are eliminated, providing a fun and enjoyable experience for the player.

From operation 206, the method then proceeds to operation 208, which checks if the game is over. Typically, the game is over when there is only one dancer left, although in less preferred embodiments the game can end when a more than one dancer is left (can be any predetermined number). If the game is over, the method then proceeds to operation 212.

If the check in operation 208 determines that the game is not over, the method then proceeds to operation 210, which takes additional bets. This operation is optional, but allows a player to place additional wagers on the game after the game has begun. Odds/payouts are determined according to game conditions. From operation 210, the method then proceeds to operation 202 which continues the game.

If the check in operation 208 determines that the game is over, then the method proceeds to operation 212 which accounts for the wagers. Winning wagers are paid and losing wagers are removed.

From operation 212, the method can then proceed to operation 200, which starts a new game.

In a further embodiment of the present invention, a player can bet on a simulated sporting game. A simulated sport can comprise baseball, football, boxing, or any sport. The game can be considered simulated because the game is played with electronic players. The game can be bet on before the game starts or during the game.

A simulated baseball game can be implemented by using a random number generator, such as a die. The random number generator is used to determined progress for each part of the game.

One possible configuration of conducting a simulated baseball game is as follows. A 6 sided dice can be rolled. Depending on the outcome of the die, a result as indicated in Table I can be attributed to the team rolling.

TABLE I

| Die roll | outcome |
|---|---|
| 1 | out |
| 2 | out |
| 3 | out |
| 4 | out |
| 5 | single |
| 6 | home run |

Each team can continuously roll the die (or other random number generator) until the team receives 3 outs, then the other team goes "up at bat." After 9 (or any other amount) of innings, the game is over.

The simulated baseball game (or other sporting event) can be portrayed with a simple box scoreboard displaying the score, inning, etc. Alternatively, computer graphics can be used to display the simulated game with computer generated players, animation, etc.

Thus, the simulated sporting event can be used "off season" so people can enjoy betting on baseball (or any other game) when the game isn't being played. Further, odds on the simulated sporting event can be easily determined, for example by running a simulation, or by using a formulaic approach. Thus, players who bet on such simulated sporting events would know with certainty the odds on each game, without any "guess work" as is required by betting on sports with payouts determined by using the standard pari-mutual method.

Figure 3:
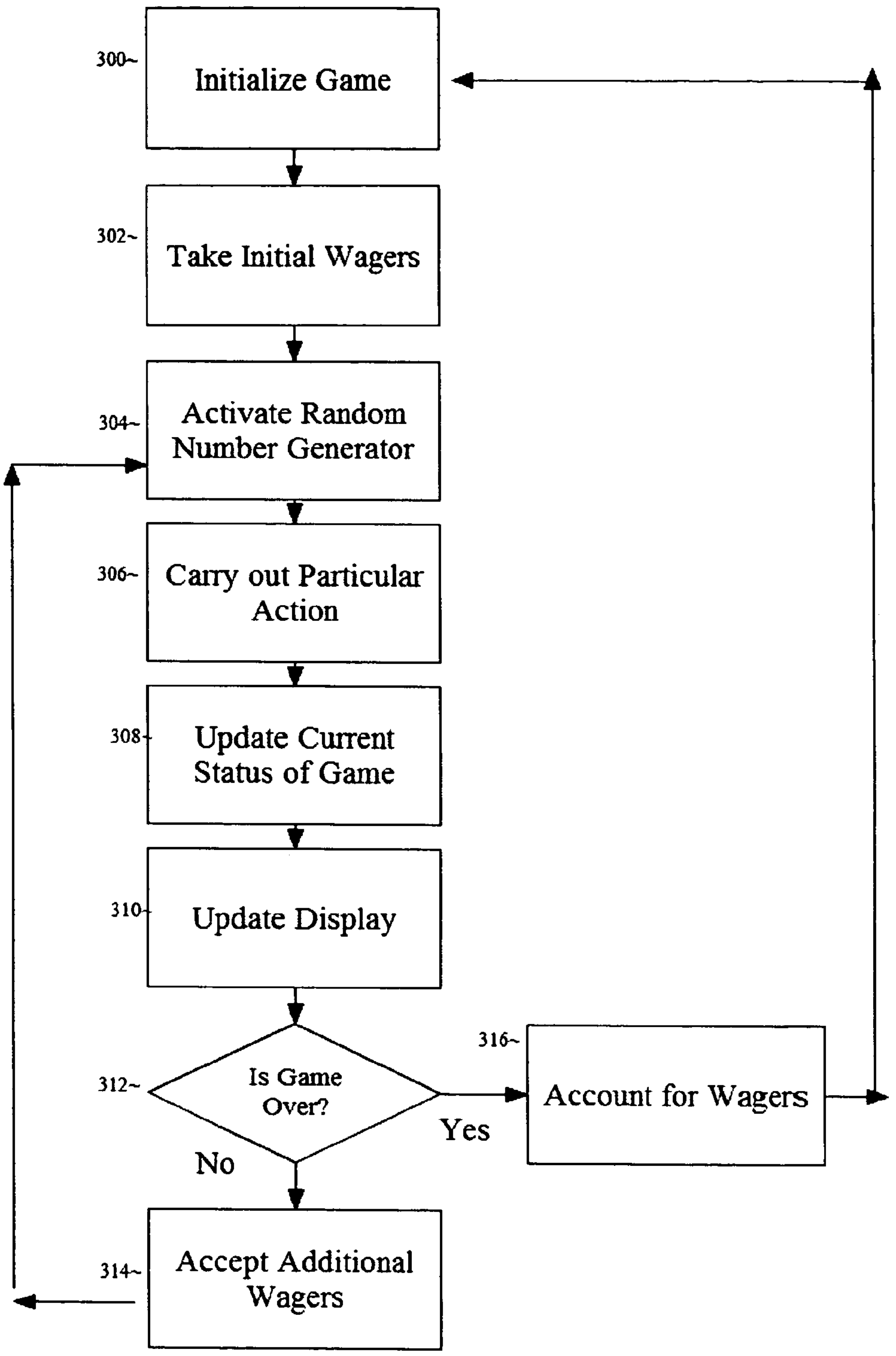
FIG. 3 is a flowchart illustrating a method of simulating a sports game and taken wagers therein, according to an embodiment of the present invention.

FIG. 3 is a flowchart illustrating a method of simulating a sports game and taking wagers therein, according to an embodiment of the present invention.

The method starts at operation 300, which initializes the game. This can comprise any method (either physical or software based) required to start a new game. This can comprise, for example, resetting a scoreboard, removing all pieces from a playing field, etc.

From operation 300, the method proceeds to operation 302, which takes initial wagers on the game.

From operation 302, the method proceeds to operation 304, which activates the random number generator. This can comprise rolling a die (either standard or special), spinning a wheel, using a software based random number generator, etc.

From operation 304, the method proceeds to operation 306, which carries out a particular action based on the result of the random number generator. This can comprise adding points to a particular teams score, moving a team (or player on a team) on the field.

From operation 306, the method proceeds to operation 308, which updates the current status of the game according to game rules, if necessary. For example, using the outcomes in Table I, when a team has three outs, then it becomes the other teams possession. Any other sequence which results in the other team's possession is accounted for in operation 306, or any other game logic required by the game.

From operation 308, the method proceeds to operation 310, which updates the display of the game. For example, the game score is updated, the players can be moved, etc.

From operation 310, the method proceeds to operation 312, which checks to see if the game is over. The game can be over based on any predetermined game rules, such as a fixed number of rolls, 9 innings, etc.

If the check in operation 312 determines that the game is not over, the method proceeds to operation 314, which accepts more wagers on the game. Note that such wagers can be taken after the game has begun, with odds determined based on the true odds of each wager being placed, but for an accommodation of the house edge. The method then returns to operation 304, which again activates the random number generator and continues the game.

If the check in operation 312 determines that the game is over, then the method proceeds to operation 316 which accounts for wagers.

Other sporting events can be simulated as well using the above method. It is also noted that proposition bets can be offered. Such proposition bets can be over/under, home runs, any value generated in the game or sum of values, or any kind of known proposition bet available for that particular sport.

Basketball can be simulated using the results illustrated in Table II. Basketball can be implemented with 4 quarters, and 4 (or any amount) of possessions per team per quarter. Each team alternates possessions.

TABLE II

| die roll | outcome |
|---|---|
| 1 | 1 point |
| 2 | 2 points |
| 3 | 2 points |
| 4 | 2 points |
| 5 | 3 points |
| 6 | turnover |

Football can be simulated using the outcomes of Table III.

TABLE III

| Die roll | outcome |
|---|---|
| 1 | 10 yards gain |
| 2 | 50 yards gain |
| 3 | field goal 3 points |
| 4 | touchdown 7 points |
| 5 | touchdown 8 points |
| 6 | turnover |

The game of darts can also be simulated by using the outcomes in Table IV.

TABLE IV

| Die roll | outcome |
|---|---|
| 1 | miss |
| 2 | miss |
| 3 | miss |
| 4 | miss |
| 5 | 1 point |
| 6 | bullseye (5 points) |

The game of bowling can be simulated using the outcomes in Table V.

TABLE V

| Die roll | outcome |
|---|---|
| 1 | gutter ball |
| 2 | 4 pins |
| 3 | 5 pins |
| 4 | 6 pins |
| 5 | spare |
| 6 | strike |

In a further embodiment of the present invention, a progression can be bet on that simulates a piece or pieces chasing another piece or pieces. This can be considered a "hunt game." Wagers can be places on either which hunter catches a piece first, or which piece is first caught by a hunter.

Hunting games are distinguished from race games by virtue of the dynamics of having the completion of the event occur at a non-predetermined ending point. Whereas a race ends at a predetermined "finish line" a hunt ends at the point where the hunter catches or meets a moving prey. The point where the prey and the hunter intersect in a hunt game is usually not stationary whereas the finish line in a race is a fixed point.

A hunt game can for example comprise of a spider hunting flies ("spider and fly hunt"). This game is different than a "race" by virtue of the movement of the hunters and/or the prey. As both spiders and the fly change position the odds change accordingly presenting wagering opportunities to add to, change, and/or hedge ones wagers within the progression. The game can be played on a square grid of variable dimension. The suggested range is 11 by 11 to 31 by 31, although any other dimensions can be used. Of course, other themes can be used as well, such as a man (or men) chasing a woman (or women), etc.

A representation of a spider can begin at each corner. Alternatively a variation with two spiders at opposite corners is also available. A representation of a fly shall begin in the middle, although any other location can also be used.

Players can have the opportunity to bet on which spider will eventually reach the fly first. The initial odds offered on each spider are n*(1−h)−1 to 1, where h is the desired house edge and n is the number of spiders. For example in a 4-spider game with a 5% house edge the initial odds on each spider will be 2.8 to 1.

At the beginning each spider shall have an equal chance of winning. The odds offered on each spider should typically be the same. In another embodiment, initial odds for each spider to win do not have to be the same (i.e. one spider may have an advantage) with respective payouts reflecting the different chances.

Each spider simultaneously rolls a die. Each spider will then move that many spaces along the grid lines toward the fly. Although the spiders are restricted to moving along the gridlines the objective will be to minimize the direct distance between each fly and the spider. In the event two movements cause the same distance then one will be chosen according to an arbitrary standard. If both options result in the same distance, the spider can opt to move east or west, as opposed to north or south.

After each spider has made his move the fly will roll his own ordinary die. The spider will then move along the gridlines that number of spaces. The object of the fly will be to maximize the distance to the nearest spider. In the event multiple possibilities result in the same distance then the decision can be made randomly.

After each fly movement all players will have the opportunity to bet again on which spider will win. A random simulation will be done based on the existing game state to determine the fair probabilities of each spider winning. If the probability of a given spider winning is p, and the desired house edge is h, then the payoff odds for that spider should be (1−h−p)/p to 1.

The above steps are typically repeated until a spider does win. For a spider to win his turn should end on the same point as the fly. The spider should use the entire roll. In many cases the spider will alternate between two points, using up his roll, hoping to end on the same point as the fly. If a spider does end its turn on the same point as the fly the fly shall not roll. Alternatively, the spider does not have to use up the entire roll.

If two or more spiders end up on the fly's point at the end of the same turn then the winner can be chosen at random. Players will have the opportunity to bet at this point which spider will win. Bets on the tiebreaker shall pay fair odds, for example even money on a two spider tiebreaker. There should be some cap set on the maximum tiebreaker bet relative to previous bets on that game. In the alternative, instead of breaking the tie, all winners can be paid with payouts divided accordingly.

An example "spider and fly" game will now be presented to illustrate the above concepts. It is noted the above rules are just exemplary, and any of the rules and parameters can be modified. This example features four spiders in a 21 by 21 grid. The staring coordinates of the spiders are: (0,0), (20,0), (20,20), and (0,20). The spider starts at (10,10).

Table VI shows the roll for the fly and each spider on each turn. The names of the spiders correspond to their staring corner, for example the SW spider started in the south-west corner.

TABLE VI

| Turn | Fly | SW spider | SE spider | NE spider | NW spider |
|---|---|---|---|---|---|
| 1 | 2 | 2 | 5 | 2 | 3 |
| 2 | 3 | 5 | 5 | 5 | 2 |
| 3 | 2 | 2 | 4 | 4 | 1 |
| 4 | 6 | 2 | 3 | 1 | 3 |
| 5 | 6 | 5 | 3 | 5 | 3 |
| 6 | 4 | 3 | 3 | 2 | 1 |
| 7 | 4 | 3 | 3 | 6 | 2 |
| 8 | 5 | 2 | 6 | 1 | 5 |
| 9 | 3 | 4 | 3 | 5 | 4 |
| 10 | n/a | 3 | 2 | 6 | 5 |

Table 7 shows the positions of each creature at the beginning of each turn, before rolling.

TABLE 7

| | Fly | | SW spider | | SE spider | | NE spider | | NW spider | |
|---|---|---|---|---|---|---|---|---|---|---|
| Turn | x | y | x | y | x | y | x | y | x | y |
| 1 | 10 | 10 | 0 | 0 | 20 | 0 | 20 | 20 | 0 | 20 |
| 2 | 10 | 10 | 1 | 1 | 17 | 2 | 19 | 19 | 2 | 19 |
| 3 | 8 | 11 | 4 | 3 | 15 | 5 | 16 | 17 | 3 | 18 |
| 4 | 7 | 12 | 4 | 5 | 12 | 6 | 13 | 16 | 3 | 17 |
| 5 | 7 | 10 | 4 | 7 | 11 | 8 | 12 | 16 | 4 | 15 |
| 6 | 1 | 10 | 7 | 9 | 8 | 8 | 10 | 13 | 5 | 13 |
| 7 | 0 | 11 | 4 | 9 | 5 | 8 | 8 | 13 | 4 | 13 |
| 8 | 0 | 15 | 1 | 9 | 2 | 8 | 2 | 13 | 2 | 13 |
| 9 | 0 | 20 | 1 | 11 | 1 | 13 | 1 | 13 | 1 | 15 |
| 10 | 3 | 20 | 1 | 15 | 1 | 16 | 1 | 18 | 1 | 19 |
| 11 | N/a | N/a | 1 | 18 | 1 | 18 | 3 | 20 | 3 | 20 |

The outcome of the game was that the NE and NW spider spiders reached the fly at the same time on the $11^{th}$ turn. As stated in the rules the winner would have been chosen randomly between the two spiders. The fly did not have an $11^{th}$ move because he was eaten.

Table 8 shows the probability of winning for each spider at each turn. Such probabilities can be determined by running a game simulation at each turn. The numbers in Table III were generated by running a 100,000 game simulation, although a smaller number can also be used. The table also shows the payoff odds corresponding to each probability based on a 5% house edge, except the tie breaker. All payoff odds are on a "to one" basis, in other words the player keeps his original bet if he wins.

TABLE VIII

| | SW spider | | SE spider | | NE spider | | NW spider | |
|---|---|---|---|---|---|---|---|---|
| Turn | Prob. | Odds | Prob. | Odds | Prob. | Odds | Prob. | Odds |
| 1 | 0.25 | 2.80 | 0.25 | 2.80 | 0.25 | 2.80 | 0.25 | 2.80 |
| 2 | 0.23 | 3.13 | 0.28 | 2.44 | 0.21 | 3.45 | 0.28 | 2.39 |
| 3 | 0.24 | 2.88 | 0.25 | 2.75 | 0.24 | 2.99 | 0.26 | 2.60 |
| 4 | 0.25 | 2.81 | 0.23 | 3.12 | 0.25 | 2.86 | 0.27 | 2.47 |
| 5 | 0.35 | 1.74 | 0.34 | 1.76 | 0.12 | 7.11 | 0.19 | 3.96 |
| 6 | 0.31 | 2.08 | 0.25 | 2.83 | 0.12 | 6.62 | 0.32 | 1.98 |
| 7 | 0.34 | 1.83 | 0.15 | 5.24 | 0.13 | 6.32 | 0.38 | 1.48 |
| 8 | 0.09 | 9.57 | 0.06 | 14.31 | 0.43 | 1.23 | 0.42 | 1.25 |
| 9 | 0.12 | 6.72 | 0.22 | 3.41 | 0.22 | 3.41 | 0.45 | 1.13 |
| 10 | 0.08 | 11.17 | 0.20 | 3.79 | 0.36 | 1.67 | 0.37 | 1.58 |
| 11 | 0.00 | n/a | 0.00 | n/a | 0.50 | 1.00 | 0.50 | 1.00 |

Table IX shows the average number of turns per game according to the grid size and number of spiders.

TABLE IX

| Grid | 2 Spiders | 4 Spiders |
|---|---|---|
| 11 by 11 | 4.667 | 3.271 |
| 13 by 13 | 5.534 | 4.024 |
| 15 by 15 | 6.328 | 4.629 |
| 17 by 17 | 7.125 | 5.284 |
| 19 by 19 | 7.911 | 5.920 |
| 21 by 21 | 8.690 | 6.564 |
| 23 by 23 | 9.455 | 7.201 |
| 25 by 25 | 10.191 | 7.830 |
| 27 by 27 | 10.952 | 8.452 |
| 29 by 29 | 11.682 | 9.073 |
| 31 by 31 | 12.409 | 9.688 |

Figure 4:
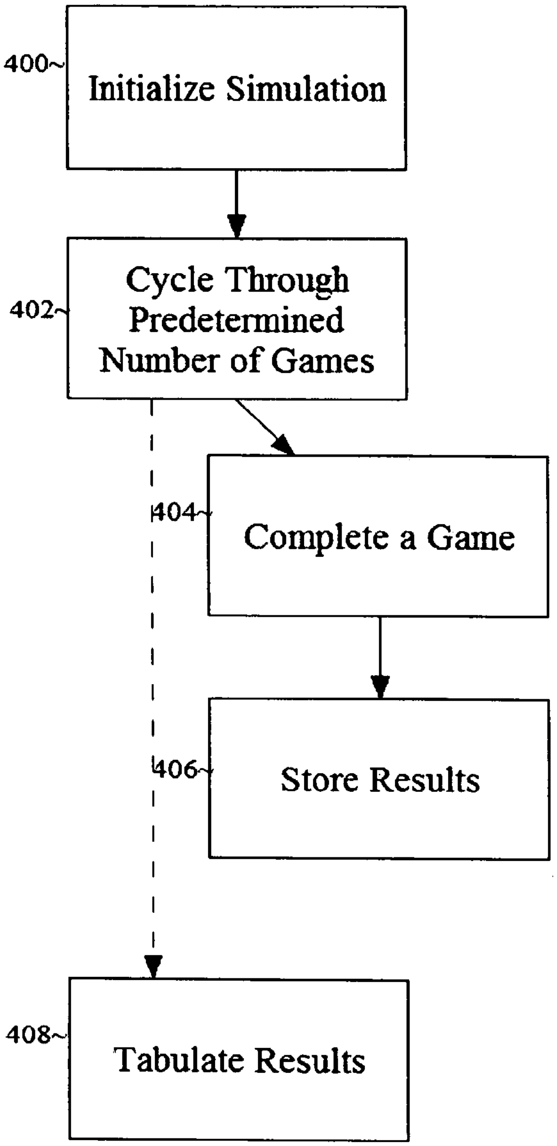
FIG. 4 is a flowchart illustrating a method for determining the odds of a particular piece winning, according to an embodiment of the present invention.

FIG. 4 is a flowchart illustrating a method for determining the odds of a particular piece winning, according to an embodiment of the present invention.

The method starts at operation 400, which initializes the simulation. This can comprise clearing counters, etc.

From operation 400, the method proceeds to operation 402, which cycles through a predetermined number of games (i.e. 100,000) with predetermined conditions.

From operation 402, the method proceeds to operation 404, which completes a game according to the game rules.

From operation 404, the method proceeds to operation 406, which stores the results of the game from operation 404, such as winners, losers, and/or any other parameters such as positions of pieces, number of ties, etc.

When the cycling in operation 402 is completed, the method proceeds to operation 408, which tabulates all of the results stored in operation 406. The chance of a particular piece (spider) winning can be computer by the following formula:

number of wins for spider/number of games in simulation

Chances for other occurrences in the game can be computed similarly. Once a probability for an event is determined, a payoff for a bet on that event can be determined using any method described.

Figure 5:
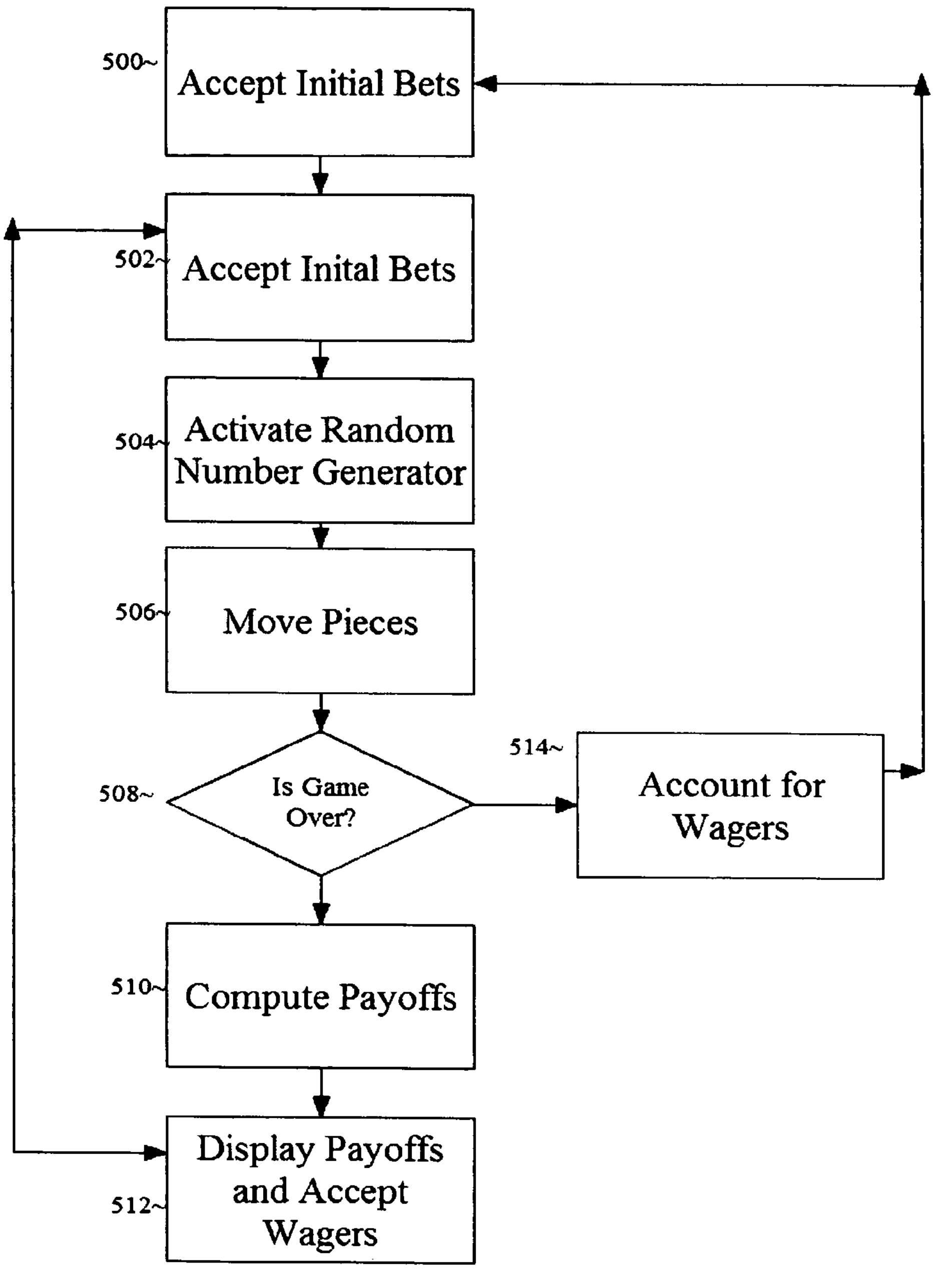
FIG. 5 is a flowchart illustrating a method for conducting a hunt game, according to an embodiment of the present invention.

FIG. 5 is a flowchart illustrating a method for conducting a hunt game, according to an embodiment of the present invention.

The method starts with operation 500, which initializes the game.

From operation 500, the method then proceeds to operation 502, which accepts initial bets.

From operation 502, the method then proceeds to operation 504 which activates a random number generator(s). Typically, a random number is generated for each piece that can move in the game.

From operation 504, the method then proceeds to operation 506, which moves the pieces according to respective random numbers.

From operation 506, the method then proceeds to operation 508, which then determines if the game is over. If the game is over, the method proceeds to operation 512.

If operation 508 determines that the game is not over, the method then proceeds to operation 510 which computes payoffs. This can be accomplished by first running a simulation as illustrated in FIG. 4.

From operation 510, the method then proceeds to operation 512, which then displays the payoffs computed in operation 510 and accepts wagers. The method then returns to operation 502 which continues the game.

If the determining in operation 508 determines that the game is over, then the method proceeds to operation 514, which accounts for all wagers. Wagers are paid based on the payoffs that were displayed when each respective bet was placed. The method can then return to operation 500 which begins a new game.

In another variation of the previously described game, the hunting pieces and/or the hunted pieces can only move in one (or more) directions. In a further variation of the game, the hunted pieces remain stationary.

In the above described variation of the game, a plurality of spiders hunt a fly. In yet another variation of the previously described game, a spider can hunt a plurality of fly, and bets can be taken as to which fly the spider will catch first. Bets can also be taken as to the order the flies are caught by the spider. All of the embodiments, methods, and variations of the above game (and described herein) can be applied to this variation as well.

The hunt games described herein (or any other games) can use a circular playing field instead of a grid as described above. Pieces (i.e. the spider/fly) can have discrete positions on a perimeter of the circle, thus giving the game a limited number of states and subject to the simulation (or formulaic) analysis method.

In yet a further embodiment of the present invention, a dice game can also be used for wagering. Any of the above described wagering methods can be used for this game as well.

A 6 sided (or any number of sides) die can be used. The goal of the game is to have every value on the die rolled. Of course, at least 6 rolls of the die would be needed Players can wager on how many rolls of the die will be required to reach the goal. An over/under bet can also be placed using a benchmark number of rolls (i.e. 10). After each roll, new wagers can be taken based on updated chances of winning any of the bets.

Additional bets on the outcome of the die can be made including whether the next roll will be odd/even, which particular number will (or will not) roll next, which number will be the ultimate winning roll, etc.

A similar game can be played with two dice. Each of the dice is in "competition" with each other on which can finish the sequence first. Players can bet on which die will finish first. Payouts can be computed and updated after each roll to reflect the new circumstances.

In a further embodiment, all of the embodiments described herein can be used for a bonus game of a slot machine. A bonus game is typically invoked when a player plays a slot machine (or other gaming device) and receives a preset combination of symbols (or cards, etc) which is set to trigger the bonus round.

The bonus round then presents the player with an additional game in order to enhance the player's enjoyment of the overall game and give the player a chance to win additional money.

Any of the games described herein can be used as a bonus game in a number of ways. One way is when the bonus game is triggered, the player can be given a predetermined amount of money to wager (i.e. $30, etc.) on the game.

In another embodiment of the present invention, a player can directly go to the bonus game by directly "buying-into" the bonus game and bypassing the requirement of having to make a special accomplishment in the main game. This alternative avenue to enter the bonus round of a game grants the player additional wagering flexibility by virtue of making the bonus feature a wagering option in it's own right as a game unto itself as well as a bonus feature within another game.

Figure 6:
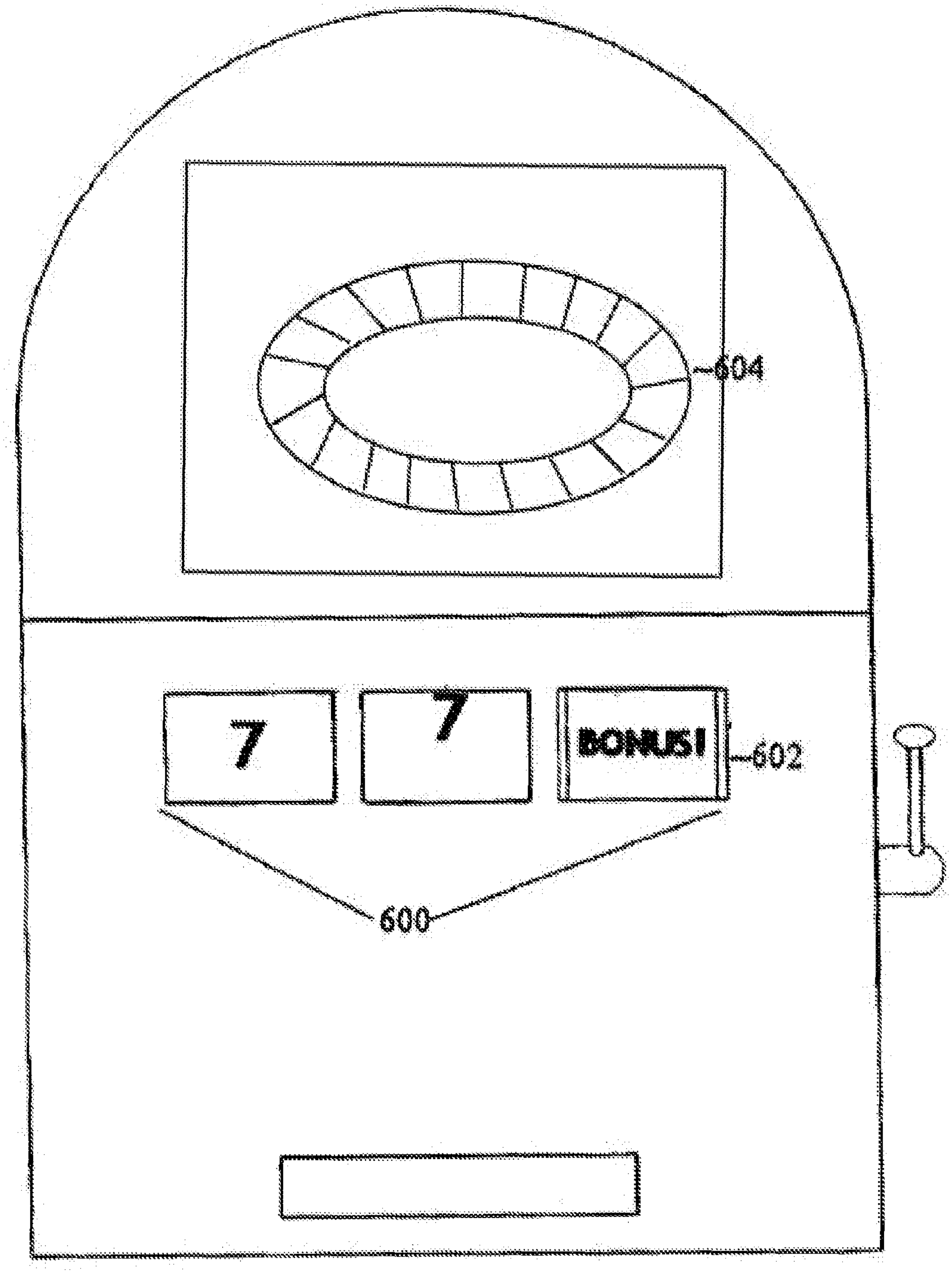
FIG. 6 illustrates an electronic gaming device (EGM) with a bonus screen, according to an embodiment of the present invention.

FIG. 6 illustrates an electronic gaming device (EGM) with a bonus screen, according to an embodiment of the present invention.

A reel display 600 displays three symbols which comprise the main game. A bonus symbol 602 triggers the bonus game (although any other triggering mechanism can be used to trigger the bonus game). A bonus display 604 is a video display which displays and allows a player to play the bonus game. The game may be played with no additional wagers by the player or with additional investment by the player.

In a further embodiment of the present invention, a bonus game can be played based on the race game. Two (or any number) of pieces can be displayed, and the goal is for a player's piece to reach a finish line faster (or with a greater distance than) a second (or additional pieces). The player can be paid according to the difference in time (or distance) between the player's piece and other piece(s).

For example, the bonus round described above can start with two pieces, one representing the player's interest. A die (or other random number generator) or dice (or other random number generator) can be activated. Each piece can move forward based on a respective roll. When the player's piece reaches a finish line, a difference in spaces between the player's piece and the other piece is tabulated. The player is paid an amount based on this difference. A lookup table can be used to determine respective payouts, or payouts can be computed directly based on the odds of a particular distance occurring. If the player's piece finishes second, then the player can be awarded a fixed "consolation prize."

In a further optional embodiment of the present invention, "pop up" screens can appear automatically when implementing any of the above described embodiments.

The pop up screens can alert the player to particular betting opportunities a player may desire to make. For example, when a player can place a bet which will result in a guaranteed win, a pop up screen can be displayed which offers the player to make the additional bet (or bets) needed to guarantee a monetary win. This can be applied to any of the games or embodiments described above.

For example, consider a scenario where the player is betting on a simulated sporting event, and the team the player initially wagered on is in the lead. Thus, the player's expectation on his or her bet could be greater than 100% (even after factoring in the house edge). A pop up screen can automatically appear and alert the player that if he or she bets on the opposing team (and possibly a tie bet as well), the player can only win money on the overall game.

Such an opportunity can be automatically determined in a number of ways. One way is to first compare the current player's cash value of his bets to a predetermined threshold. If the value is smaller than the threshold (or has a negative value), a guaranteed win bet is not worth the player's trouble (i.e. to only win $0.50) or not possible (if player's current bets have a value less than originally bet).

Then, opposing bets (or all bets, including any combinations) can be cycled through and wagered on to determine a proposal that always has a winning result, regardless of all possible game results.

For example, suppose a player makes an even money $100 bet on sports team A vs. team B. During the game, the simulation (or other method) determines that the chances of A winning is 75% and the chances of B winning is 25%. Assuming no house edge for simplicity, the player's bet is worth $150. In order for the player not to lose (if B wins), the player must win his initial $100. Since the chances of team B winning is 25%, a bet on team B would pay 3:1 (i.e. a $1 bet would result in $4). So to win $100, the player must bet $100/4=$25.

Thus, by betting $25 on team B, the player cannot lose. He will push if B wins, and win $75 if A wins. The player can bet $50 on which would guarantee him to win $50 if A wins and $100 if B wins. If a tie is allowed, then the player may have to wager on the tie as well in order to be guaranteed a winner.

Figure 7:
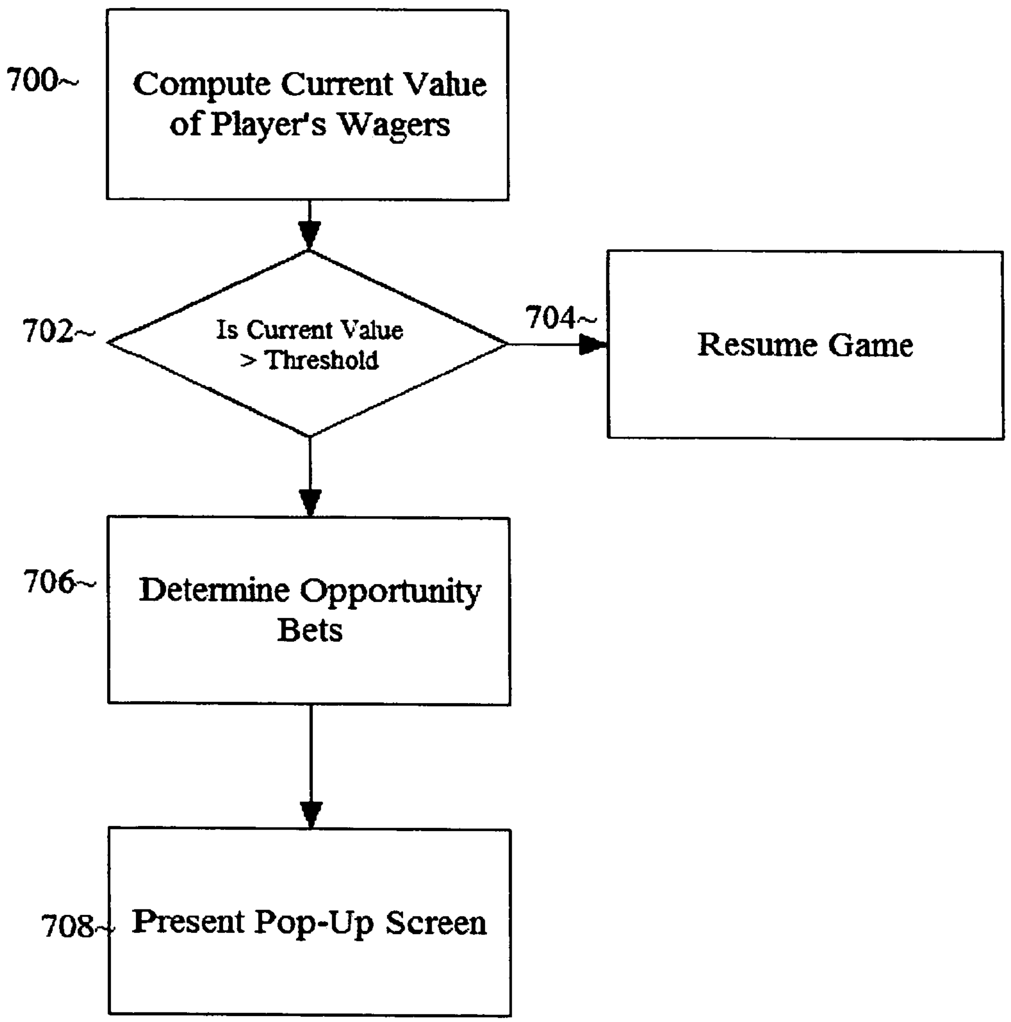
FIG. 7 is a flowchart illustrating a method of activating pop up screens, according to an embodiment of the present invention.

FIG. 7 is a flowchart illustrating a method of activating pop up screens, according to an embodiment of the present invention.

The method starts at operation 700, which computes the current value of the player's wager(s). This can be done by using the current payouts/probabilities computed by the game to see the value of the player's current bets. For example, if the player made an even money $100 bet on A, and during the game the probability of A winning has gone up to 75%, the players cash value of the wagers is $175 (not considering house edge).

From operation 700, the method then proceeds to operation 702, which compares the current cash value to a predetermined threshold. If the value is smaller than the threshold, then a betting opportunity either isn't practical or isn't possible, and thus the method proceeds to operation 704 which resumes the game.

If the comparison in operation 702 determines that the cash value is greater than the predetermined threshold, the method then proceeds to operation 706, which determines opposing bets to guarantee a winner ("opportunity bets"). This can be done by using the methods described above. A "smart" system would know which opposing bets to choose (i.e. using programmed logic or a look up table), or a "dumb" system could simply cycle through all available wagers, and try (or compute) various wagers to compute results for all possible outcomes of the games. Outcomes in which the player cannot lose can be considered an "opportunity" play. It is also possible that the algorithm will not find such a play, in which the method proceeds to operation 704.

From operation 706, the method then proceeds to operation 708, which presents the player with a pop up screen indicating the bet. The player then has the choice to conveniently accept the bet, upon which the computer automatically places it, or decline. The operation of presenting a pop up screen may be presented each time such an opportunity arises, or only upon certain conditions. Certain conditions could comprise that the guaranteed profit will be greater than a predetermined amount, or that the player will only be interrupted with a pop up screen every so many turns (such as only 1 in 5 turns, or upon a random trigger). A pop up screen may also not "pop up" but can be invoked by the player (for example by pressing an icon or button).

Pop up screens can also optionally answer player questions. For example, the player may wish to ask how much the player needs to bet on a particular bet to be guaranteed a winner. The player may also ask how much he or she has to bet on a tie to cover his or her bets. The player may also ask what his or her chances or winning are (either on a particular bet or on the entirety of bets) at a particular point in the game.

The player can also set pop up preferences. For example, the player can indicate that he or she wishes the pop up window to appear whenever there is a particular betting opportunity that meets the player's preset criteria. For example, the player can indicate that the player wishes a pop up screen to appear when there is a betting opportunity which will guarantee the player a win of a predetermined amount, for example $100. Alternatively, the player can indicate that the player wishes a pop up screen to appear when it is possible for the player to make a bet such that the player will have a chosen probability of winning overall (i.e. 75%).

Figure 8:
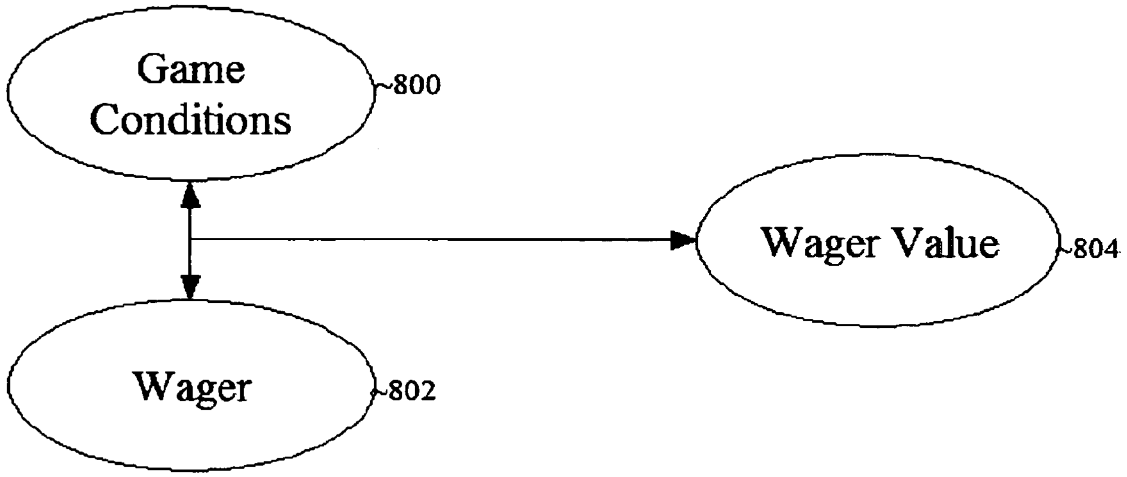
FIG. 8 is a relational diagram illustrating a relationship between game conditions, a wager, and a bet value.

FIG. 8 is a relational diagram illustrating a relationship between game conditions, a wager, and a bet value.

Game conditions 800 can comprise such parameters as number of horses, a length of a track, a game score, or any value associated with any game. A wager 802 is a wager typically selected by a player on any of the game values. Typically, a wager is placed on a piece (or team) to win a progression or game, but as discussed any game value can be subject to a wager. Any game value can be bet on to end up higher or lower than a predetermined threshold, or any game value can be bet on to be higher than any other game value. For example, the number of home runs a team can achieve can be bet on.

A wager value 804 of the wager 802 depends on the game conditions 800. The wager value 804 can be determined using the simulation method described herein or by a formulaic approach tailored to the particular game.

Note that both the game conditions 800 and the wager 802 affect the wager value 804. If the game conditions 800 or wager 802 is changed, the wager value 804 is affected. Thus, a player can alter the game conditions 800, as long as the wager value 804 is preserved. This concept is explained below in more detail and becomes important when "tailoring" games.

All of the games described above can be tailored according to the player's wishes. The tailoring can be performed before the game begins or even during the game. For example, the previously described race game whereby horses (or any other symbol) race around a track can be tailored to the player's wishes. Before the race begins, the player can choose the number of horses to be included. The player can also include the length of the track. The payouts are automatically adjusted to reflect the difference in odds of winning. A player can place the pieces on any spaces he wishes, and choose which piece or pieces to bet on (to win, exacta, trifecta, etc.) Since the odds can be calculated to reflect any situation using the simulation method, the house will always have the advantage on any bet taken. Of course, if a player already has a live bet, then either the pieces cannot be moved at that point, or pieces can be moved, but a value of a player's action is preserved even though a piece (or pieces) is moved.

The games can also be tailored after the race begins. For example, a player can move a position of a horse(s) to any other position. The player can reduce the number of squares on the field. When the parameters of the game are changed during the game, live bets are typically adjusted accordingly to accommodate. For example, consider a player who bets $100 on horse "A" to win a race with 2 other horses "B" and "C" at a payout of 2:1 (consider no house edge for simplicity). Horse B is winning, and suppose horse A has a 1/4 chance of winning, thus the value of the player's bet dropped to $75 (this information may or may not be displayed to the player). The player is upset that he or she is in a losing position and wishes to remove horse "B" from the race. The player is free to do so. With only horses "A" and "C" remaining in the race, of course the chances for horse A to win have now increased. Thus, the value of the player's bet must be decreased to compensate. Thus, the (probability*payoff) of any live bet should typically remain constant. Suppose that if horse B removed, the chances of horse A winning is now 50% (i.e. horse A and horse C are on the same square). Since the previous (probability*payoff)=$75, the new payoff can be computed as: $75/0.50=$150. Thus, if horse A wins, the player now gets $150 instead of the $300 the player was originally supposed to get. Since the chances of horse A winning (with horse B removed) is now 50%, it can also be considered that the player now has a $75 to win even money bet on horse.

Thus, as the above example illustrates, any parameters in any of the games described herein can be changed, with the payouts (or amounts bet) automatically adjusted to reflect the new situation. Players can change the score of a game, positions of pieces, number of chairs in the musical chairs game, number points made in the 6 sided die game, etc. These are merely some examples, but any parameter of any game can be changed. As another example, this principle can even be applied to video poker by allowing the player to choose which cards he wishes to receive, upon which payouts are adjusted to preserve the overall return of the game.

Figure 9:
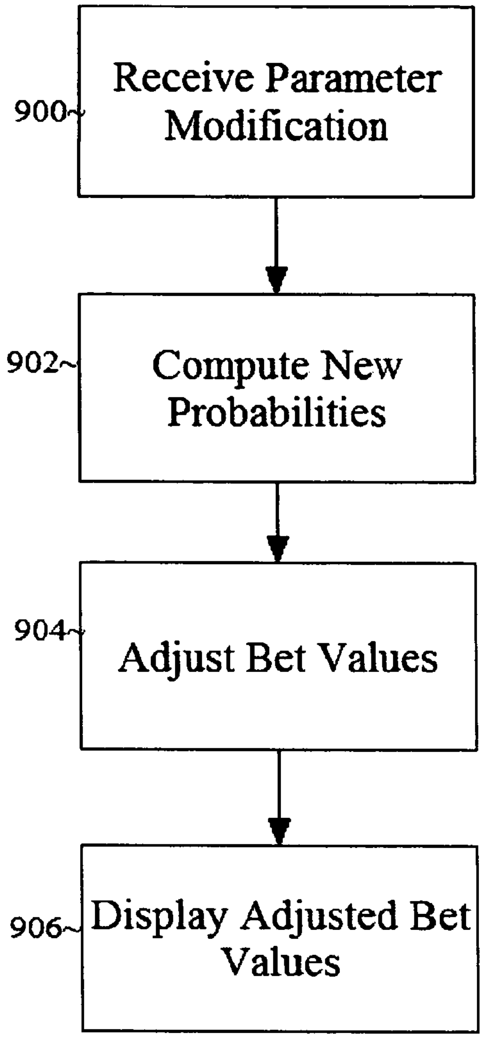
FIG. 9 is a flowchart illustrating a method of tailoring games, according to an embodiment of the present invention.

FIG. 9 is a flowchart illustrating a method of tailoring games, according to an embodiment of the present invention.

The method starts at operation 900, which receives a parameter modification from a player. The player can use any input device, such as a touch screen, mouse, etc, to indicate which parameter he or she wishes to change and the new value. If a player wishes to remove a piece from a game, the player can drag that piece off the screen or into a garbage can. Any other known GUI technique can be used to receive the player's preferences.

From operation 900 the method proceeds to operation 902, which computes new probabilities of each bet winning for new parameters. This can be done using any of the methods described herein.

From operation 902, the method proceeds to operation 904, which adjusts bet values/payoffs for each live bet. As discussed above, (probability payoff) for each bet must be preserved.

From operation 904, the method proceeds to operation 906, which displays the adjusted bet values and/or payoffs for each bet. The game then proceeds normally.

By using the method illustrated in FIG. 9, any game can be adjusted during play according to a player's wishes. If there are no live bets on the game, then parameters can be simply'changed by the player (and corresponding payouts adjusted) without a need for adjusted live bet values.

Optionally, when adjusting game parameters, a split screen can be initiated which displays the original game with the original conditions and the new screen with the adjusted game with its parameter conditions. A player can have the opportunity to bet on both. The same random numbers can be used to progress both screens. For example, in a race with horses A, B, and C, and horse B is removes, horses A and C will progress similarly in both screens.

Typically, adjusting game parameters is performed during a single player game so that other player's don't disagree with the changes, although such changes can also be made in a multiplayer game as well.

Further, the computer can also automatically tailor game parameters to suit a player's desired wager conditions. In this instance a player would request particular odds that the electronic device would respond to with a corresponding wagering situation reflective of the players requested degree of risk. For example, suppose a player currently has a 25% chance of winning a game and he or she wishes to have a 50% chance of winning the game. As described above, the player can adjust game conditions to have this result. Alternatively, the player can directly indicate wager conditions (i.e. that he or she wishes to have a 50% chance of winning the game), and the computer can automatically adjust game conditions which will result in the player's wager conditions. This can be done by identifying one (or more) game conditions (i.e. position of player's piece) which affect the player's desired wager conditions, adjusting the game condition(s), and using the simulation (or formulaic) approach to determine the wager conditions resulting from the change in game condition(s). The adjusted game conditions can be determined by using an iterative loop, a formulaic approach, or even random guesses with further tries based on previous results. When an acceptable result is found (desired parameter(s) equals or is close enough to the player's wager conditions), the determined game conditions can be changed, or first proposed to the player for the player's approval.

In yet a further embodiment of the present invention, any game can offer a "fast forward" feature. This feature allows the player to indicate that he or she does not wish to wait any longer for the game to finish, and thus the game can quickly (or instantaneously) advance to the end game so that the player can be notified if he is a winner or loser, and how much he has won or lost.

For example, consider a player has some live bets (a win bet and some proposition bets) on a simulated sporting event (i.e. bowling). The player can indicate that he or she wishes to "fast forward" the game, typically by pressing a button or icon, typically when the player is asked to make further bets. The computer then either speeds up the game so the player can see a fast version of the game without further prompting for additional bets or pop up screens, etc. Alternatively, the computer can just compute the final state of the game and display the final state to the player.

Figure 10:
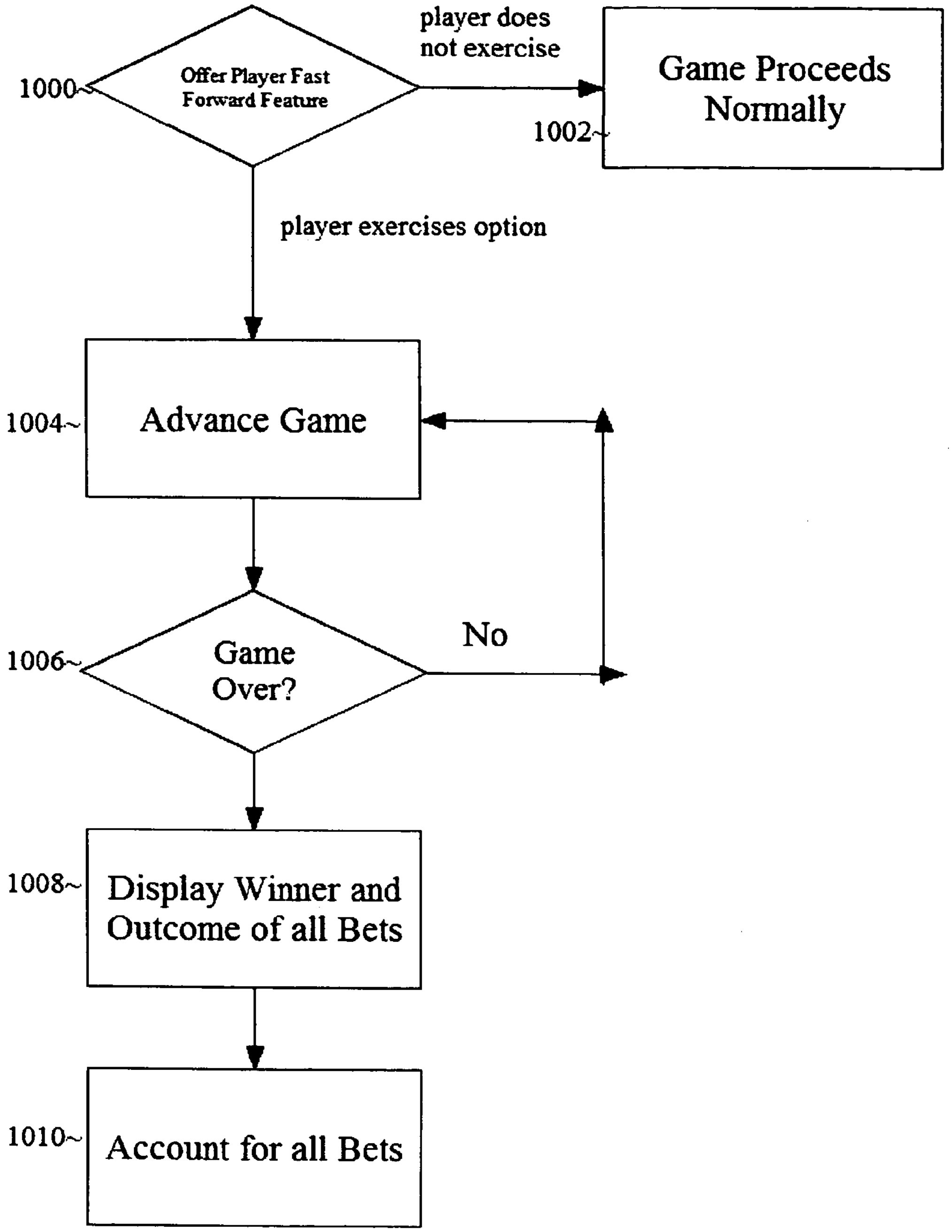
FIG. 10 is a flowchart illustrating a method for implementing a fast forward feature, according to an embodiment of the present invention.

FIG. 10 is a flowchart illustrating a method for implementing a fast forward feature, according to an embodiment of the present invention.

In operation 1000, the player is offered the fast forward option. If the player chooses not to invoke fast forward, then the method proceeds to operation 1002, which continues the game normally.

If the player exercises the fast forward option in operation 1000, the game proceeds to operation 1004 which advances the game. The advancement is made using the same methods as described herein. The results of the advancement (before the end of the game) may or may not be displayed to the player.

From operation 1004, the method proceeds to operation 1006, which determines if the game is over. As discussed previously, the game is typically over when a simulated (or real) time period is over, such as 9 innings, etc. A game may also be considered over when no more live bets need to be resolved. If the game is not over, then the method returns to operation 1004, which further advances the game.

If the determining in operation 1006 determines that the game is over, the method proceeds to operation 1008 which displays the game winner and outcome of all bets. All bets can include every possible bet, such as proposition bets, etc., or alternatively typically just bets the player has made.

From operation 1008, the method proceeds to operation 1010, which accounts for all bets. Winning bets are paid and all bets are removed so that a new game can begin.

Additional bets can be made on the racing game. For example, a player can wager that a first horse will beat a second horse, regardless of whether either the first or second horses win the race. This wager can also be offered for a real live horse race as well. For a computer simulated race, the payoff of this bet can be determined mathematically by using the simulation method. For a live race, the payoff for this bet can be determined by a standard pari-mutual method. For example, with a race with horses A, B, and C, a player can bet that horse C will beat horse A, regardless of the finishing order of the race or the remaining horses. Thus, for example, if the finishing order of the race is BCA, then the player would win this bet.

In yet a further embodiment of the present invention, a player can play a game without making a wager. The player is free to watch the game and make a wager whenever he or she wishes. For example, a race game can start and the player can watch. The player can even experiment by adjusting conditions of the game, such as the length of the track, position and number of pieces, etc. Eventually attractive wagering scenario/odds may evolve and, the player may then wish to place a wager, and the payoff on the wager is always computed based on the current game situation so that the payoff on the wager is related to the probability of that wager winning and also the house edge.

In yet another embodiment of the present invention, when a player wins a game, this can trigger another game. For example, a player can wager on a progression, and if the player wins, then a slot spin can be triggered. The slot spin may play like a typical slot game. The slot spin can result in a combination which can multiply the winning wager of the progression by a multiplier. The slot spin can also allow the player to hit a jackpot.

It is also noted that any and/or all of the above embodiments, configurations, variations of the present invention described above can mixed and matched and used in any combination with one another. Any claim herein can be combined with any others (unless the results are nonsensical).

Moreover, any description of a component or embodiment herein also includes hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of playing a wagering game, the method comprising:

performing the following operations on an electronic processing unit:

accepting an initiation wager from a player to initiate a multi-state game, the multi-state game comprising a plurality of different states in time, the plurality of different states enabled to accept additional wagers from the player;

initiating and displaying, but not completing, the multi-state game in response to the accepting the initiation wager from the player;

offering the player an option to quickly progress the multi-state game to completion after the initiating and displaying;

receiving an exercise of the option from the player to quickly progress the multi-state game to completion;

displaying a fast version of the multi-state game to quickly progress the multi-state game to completion, which displays remaining states of the multi-state game without further accepting the additional wagers enabled to be placed in the remaining states in the multi-state game;

determining payouts for the initiation wager and any of the additional wagers accepted from the player prior to receiving the exercise of the option; and awarding the player any earned payouts in accordance with the determining.

2. An apparatus to play a wagering game, the apparatus comprising:

an output unit;

an input unit; and a processing unit connected to the output unit and the input unit, the processing unit programmed to:

accept an initiation wager from a player to initiate a multi-state game, the multi-state game comprising a plurality of different states in time, the plurality of different states in time enabled to accept additional wagers from the player;

initiate, play, and complete the multi-state game in response to the initiation wager being placed by the player, the multi-state game being displayed on the output unit;

offer, during the play of the multi-state game, but before completion, the player an option to quickly progress the multi-state game to completion after at least a first state of the multi-state game is displayed, the option configured, when exercised from the player, to display a fast version of the multi-state game to quickly progress the multi-state game to completion, which displays remaining states of the multi-state game without further accepting the additional wagers enabled to be placed in the remaining states in the multi-state game;

determine, after the multi-state game is completed, payouts for the initiation wager and any of the additional wagers accepted; and award the player any earned payouts in accordance with the determine operation.

* * * * *